April 21, 1936.  L. WELLS  2,038,328
MANUFACTURE OF RUBBERIZED FABRICS
Filed June 5, 1935  2 Sheets-Sheet 2
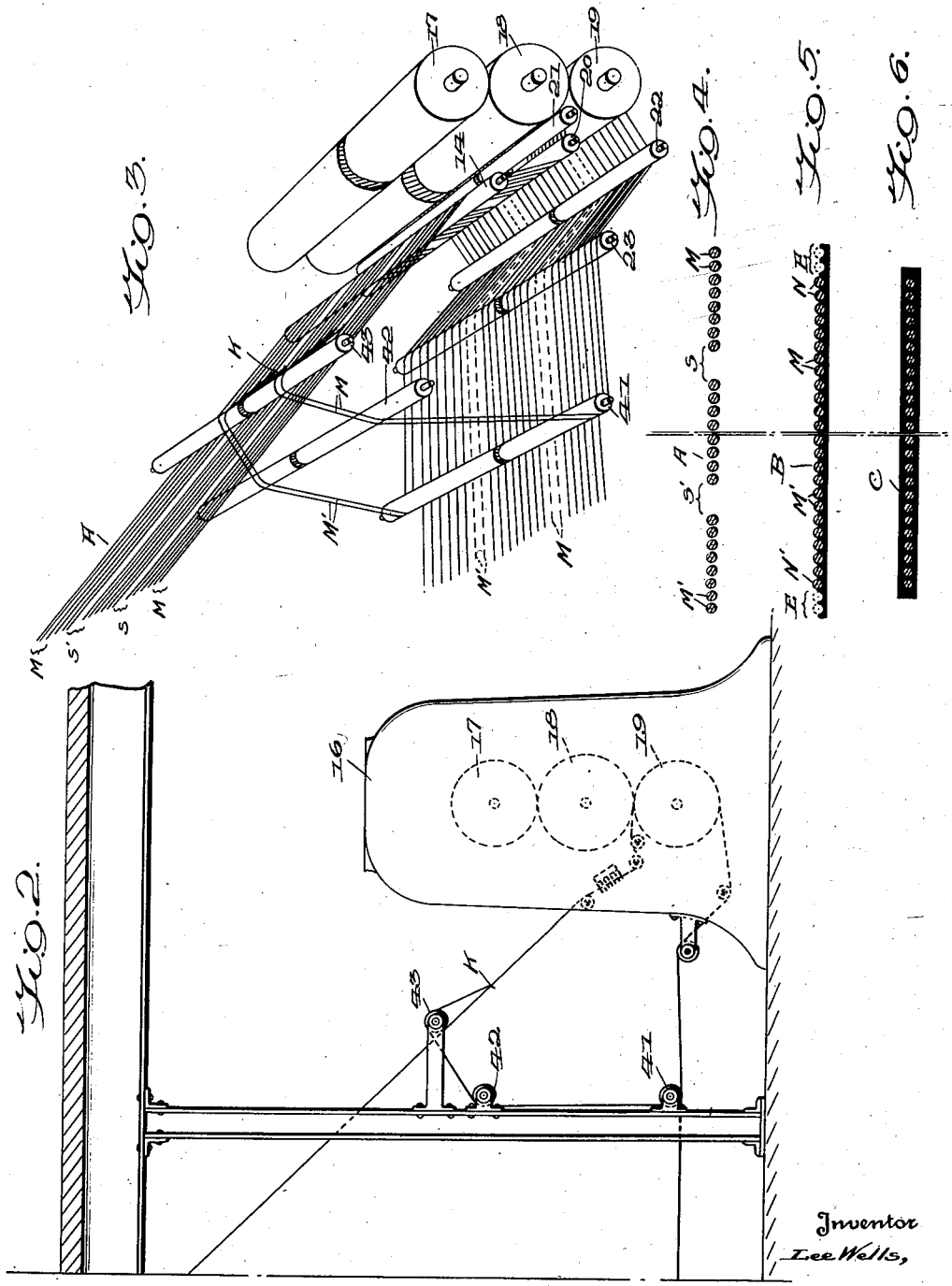
Inventor
Lee Wells,
By Edmund H. Parry Jr
Attorney Patented Apr. 21, 1936

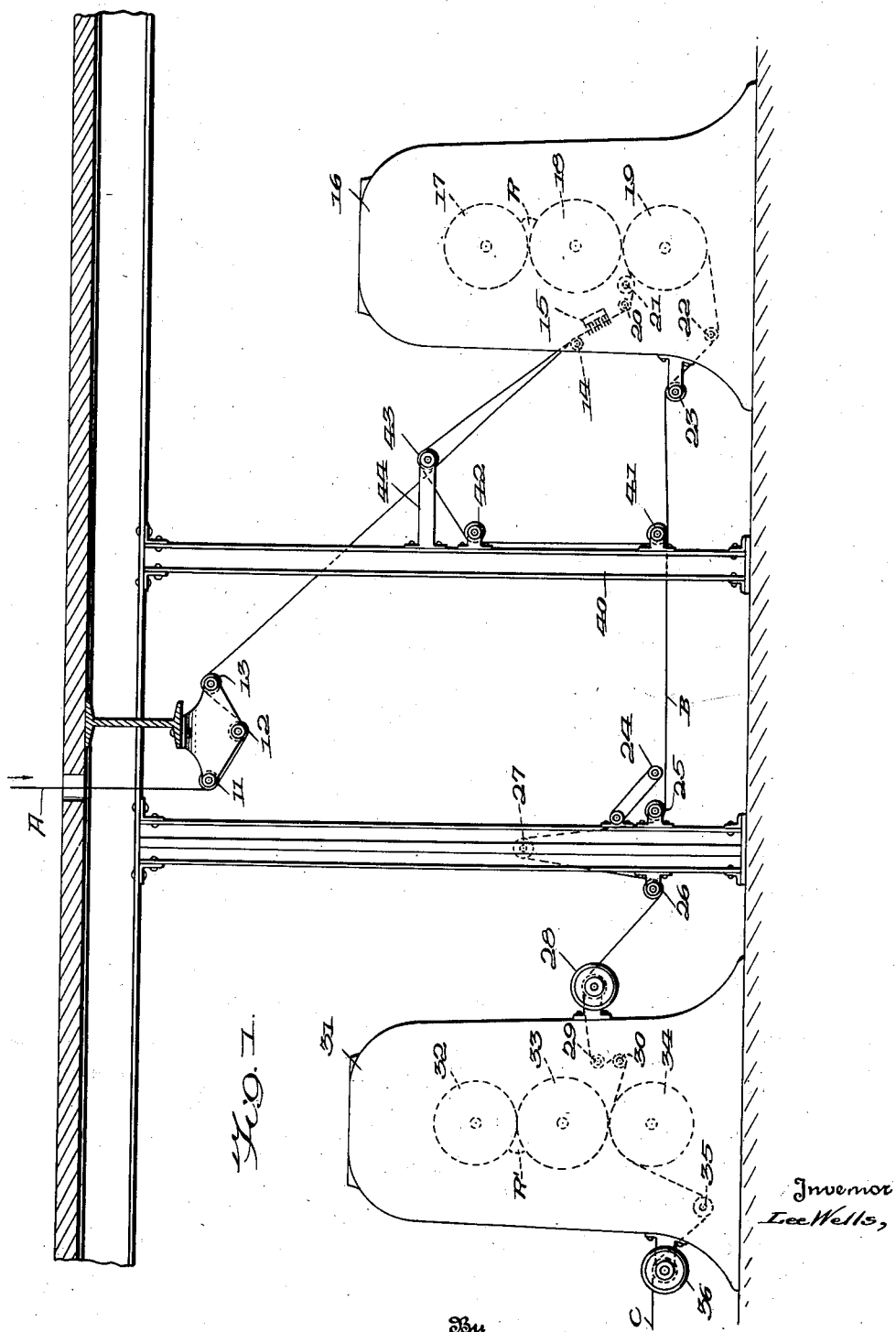

2,038,328

UNITED STATES PATENT OFFICE 2,038,328

MANUFACTURE OF RUBBERIZED FABRICS

Lee Wells, Barberton, Ohio, assignor to Seiberling Rubber Company, Akron, Ohio, a corporation of Delaware Application June 5, 1935, Serial No. 25,173

33 Claims. (Cl. 154—2)

This invention relates to rubber coated fabric produced by applying rubber to one or both sides of reinforcing material, and aims particularly to overcome during the course of formation, the problem of obtaining adequate rubberizing at the marginal edges of the reinforcing material. Rubberized fabric is conventionally manufactured by feeding the body fabric through one or more sets of rubber calendering rolls. Rubber may be applied to one side in a single or successive operations, or may be applied to both sides either simultaneously or in separate operations. The rubber as applied by the calendering rolls tends to thin out at the edges of the fabric, due to lack of adequate pressure and other reasons, so that the threads or cords at the margins of the fabric are not thoroughly coated. It frequently happens therefore that the marginal edges have to be removed and scrapped as waste which detracts from economical manufacture.

In one of its broadest aspects the present invention involves feeding additional material adjacent to but unconnected with the marginal edges of the main fabric during the rubber coating thereof, the removal of such additional material from the marginal edges, and further utilization of the withdrawn material in the fabric making process. In the rubberizing of the fabric in a series of coating operations, the invention involves feeding additional material along the fabric margins during the preliminary coating and the withdrawal of such material before the coating has been completed in one or more further stages. It is further contemplated that the material initially supplied at the fabric margins may be transposed inwardly and incorporated in the body of the rubberized fabric. The invention is peculiarly concerned with the manufacture of cord fabric, frequently known as creel fabric, such as used to a large extent in the manufacture of cord tires, and results in considerable advantages and saving in connection therewith.

As is well known to those skilled in the art, weftless cord, or creel, fabric suitable for use in tires is produced by leading cords from separate spools, supported by one or more creels, into parallel closely spaced relation, passing the assembled series of cords through rubber calendering rolls which apply rubber coating on one or both sides thereof. Usually a thin preliminary coating is applied to the cord series in an initial calender unit on one or both sides in an initial calender unit and the cord series is then passed through one or more further calendering units wherein successive additional rubber coats are applied. The cords must be guided and held in parallel properly assembled relation prior to their passage through the first calendering unit, but thereafter the preliminary coating serves to hold the threads in proper relation for the further coating treatment. After emerging from the last calender unit the cords are thoroughly coated on both sides and in its final sheet form the rubberized fabric is taken up on a reel.

The problem of obtaining thorough rubberizing of the edge cords of creel fabrics is a particularly serious one. The individual cords are usually about .035 inch in diameter and the fabric runs about 17 to 20 cords per inch. For purposes of manufacturing economy the fabric is made substantially as wide as the rolls of the calendering machines. The fabric in its final form is relatively thin, and it is found necessary to make the one or more individual coatings of substantially film thickness, approximately .01 inch, by proper adjustment of the sets of calendering rolls.

In making fabrics under the procedure and having the characteristics mentioned, and also to a proportionate degree in making heavier cord fabrics, the marginal edge cords frequently are not properly rubberized, and have to be removed as scrap after the sheet is completed. As the rubbber is applied to the cord series coming from the creel to form a surface coat and fill the cracks between individual cords, there is a tendency for the edge cords to spread, and because of the tendency of the rubber to work off the ends of the calendering rolls there is often insufficient pressure to insure a thorough coating at the edges of the outermost cords. Also, if the fabric be then passed to another calender unit the marginal edge cords, because of inadequate coating, tend to curl over on top of adjacent cords so as to be crushed when passing through the next calendering rolls, and form a bad edge several cords in thickness.

In overcoming the difficulties referred to the present method involves feeding one or more additional cords adjacent the marginal edge cords of the fabric so that the latter cords will be thoroughly rubberized. The additional cords will, of course, receive a slight film of rubber. After the preliminary coating of either or both sides, which may be carried out in one or two calendering units, the additional edge cords are removed from the margins, leaving a slight surplus of rubber beyond the outermost cord of the main fabric. Such excess of rubber tends to curl over, and can be compressed to provide a thorough rubberized margin by passing the fabric through subsequent calendering rolls.

A particular feature of the invention is the utilizaton of the auxiliary edge cords in the finished fabric, and accordingly it is contemplated after their removal from the marginal edges to reintroduce them between other cords of the main series. To prevent crowding and allow adequate space for the transposition of the additional cords, it is desirable to initially feed the cord series from the spools with one or more spaces intermediate the edges for the subsequent introduction of the additional cords which are initially fed at the margins.

Where there is only one coating operation, the removed marginal cords in their new position will be again passed through such operation. If a series of calender machines are employed the marginal cords will be withdrawn after preliminary coating in one or two of the machines and reintroduced at intermediate points in the cord series before subsequent coating on further machines. The additional threads under the latter practice are positioned at the marginal edges of the series during the preliminary coating and pass through subsequent coating operations between other cords so as to form an integral part of the fabric when completed. It is also contemplated that the additional threads after being removed from the margins of the cord series following the preliminary coating operation shall be transposed to their new position and again fed with the threads incoming from the spools through the preliminary coating operation before the complete series of threads, with the additional threads in their new position, are subjected to subsequent coating operations.

The novel process and apparatus of the invention will be described in their preferred adaptations to one conventional coating installation in connection with the accompanying illustrative drawings wherein:

Fig. 1 is a side elevation, more or less diagrammatic, showing two rubber calendering units and the cord feed with an arrangement of devices to carry out my improved method in the production of creel fabric;

Fig. 2 is a view of the initial calendering unit of Fig. 1, showing the manner of feeding the cords at the start of operations;

Fig. 3 is a perspective of the calendering rolls of the first rubberizing unit, and the manner of feeding the cords both before and after passing through the rolls, the arrangement being that at the start of operations, as in Fig. 2, without the application of the preliminary rubber coating;

Fig. 4 shows the preferred arrangement of said cords, greatly magnified, from the source of supply to the first calendering unit;

Fig. 5 shows the partially formed fabric following the preliminary coating operation in the first calendering unit and after the additional edge cords have been removed from the margins and transposed to positions intermediate other cords preparatory to passing to the next calendering unit; and Fig. 6 shows the cord fabric after passing through the second calendering unit.

As previously mentioned, the successive coatings of the cord fabric may be carried out in any desired number of calendering machines, it being contemplated that rubber shall be applied to one or both sides of the cords, and that the same may be applied in one or more coatings to either or both sides. For the purpose of understanding the present invention it will be sufficient to consider an arrangement including two calendering units, which successively apply coatings to the opposite sides of the cords. Such an arrangement is illustrated in the drawings.

A series of cords A are fed from a series of spools under individual tension and arranged in close parallel relation. The spools and the creel or other support therefor are not shown as such an arrangement is well undestood in the art, and as indicated in Fig. 1 the cord supply is frequently mounted on the floor above the sheet forming mechanism. It will be understood, therefore, that the series of cords A have already been arranged by passage through suitable guides in their proper parallel relation when they reach the point at the top of Fig. 1. The cord series passes around a series of idler rolls 11, 12 and 13 and then passes downwardly to a bank of rubber calendering machines. The uncoated cords pass over an idler roll 14 and then through a cord aligning member 15 to the first rubber calendering machine 16. Such machine is of conventional construction and comprises three calendering rolls 17, 18 and 19. The upper two rolls 17 and 18 are adapted to work a mass of rubber R into a sheet or film, the thickness of which may be regulated by adjusting the rolls relative to each other. The rubber sheet or layer so formed then passes down between roll 18 and the lowermost roll 19.

The incoming series of cords passes under idler rolls 20 and 21 over calender roll 19 and the rubber sheet is applied thereto by roll 18. The rolls 20 and 21, or either of them, may if desired be heated so as to raise the temperature of the cords and facilitate the application of rubber thereto.

After leaving calendering roll 19 the cord series with the preliminary rubber coating on its under side passes under and over idler rolls 22 and 23 on their way to the next calendering machine to receive a further rubber coating. From roll 23 the main cord series passes under a brush 24 mounted on a swinging arm and then through an air controlled tensioning mechanism comprising a pair of stationarily supported idler rolls 25 and 26 and an air controlled adjustable intermediate roll 27. After leaving the tensioning mechanism the cord series passes over a powered feed roll 28 and then over and under idler rolls 29 and 30 which may be at an elevated temperature to heat the preliminarily coated cords preparatory to the next coating operation. From roll 30 the material then passes through calendering machine 31, similar in construction to machine 16, and comprising rolls 32 and 33 which form a sheet or film from a mass of rubber R' and a lower roller 34. The cord series coated on its underside is fed over roll 34 and the rubber carried around roll 33 is applied on the upper side thereof. The cord series now coated on both sides passes under idler roller 35 and over power tensioning roller 36. If, as well may be the case, sufficient rubber coating has been applied to the cords in calendering machines 16 and 31, the fabric may then be taken up on a reel. It will be understood, however, that it may be desirable to apply one or more further coatings of rubber in which case the fabric is then fed through additional calendering machines. The arrangement so far described is more or less conventional. So far as the invention is concerned the arrangement may be varied so that successive coats of rubber are applied to one side of the fabric in two or more machines and subsequent machines provided to coat the second side of the fabric. It may be pointed out further that in any coating stage the rubber may be applied as a friction coating or as a smooth coating by running the lowermost rolls of the calendering units at a different or the same speed.

The practice of the invention and illustrative devices suitable therefor will now be considered in connection with the general layout of mechanism heretofore described in connection with Fig. 1.

The marginal cords of the cord series in passing through the calendering rolls 18 and 19 from the source of supply with the other cords ordinarily do not receive a satisfactory preliminary coating due to the fact that the rolls are usually at a lower temperature at their ends, because of the tendency of the rubber to work off the ends of the rolls, and probably also because of the tendency of the edge cords to spread away from the other cords during the application of the rubber. In any event it has been definitely found that the edges of the fabric are normally not well coated and after the fabric has been completed must be removed by cutting off the marginal edges of the fabric. This difficulty is overcome by the manner of feeding the cords now to be described.

The cord series A goes through the preliminary rubber coating operation, carried out in the illustrative apparatus by calendering machine 16, with the marginal cords in their usual relation with the intermediate cords of the series, all as illustrated in Figs. 3 and 4. After the cords have received the preliminary coating on one side they are removed from the line of the cord series by means of a roller 41 mounted in the path of travel of the main cord series at a suitable point between the calendering machines 16 and 31. The number of marginal cords M and M' to be removed is subject to considerable variation. In the drawings I have indicated only the two outermost marginal cords at each edge of the cord series, but it may well be that 5, 10 or more marginal cords will have to be removed before reaching a point in the cord series where a thorough rubber coating is found.

In Fig. 5 I have indicated the partially coated fabric B as it appears after the removal of the marginal cords preliminary to passing into the next calendering machine. The excess rubber margins from which the edge cords have been removed are indicated at E and E'. During passage to the calendering machine 31 the excess rubber tends to curl over and lap the new edge cords N and N' and during the passage through the next calendering machine for the second coating operation the excess rubber is compressed so as to form a thoroughly rubberized edge along the cords N and N'.

Conceivably the marginal cords after being removed preliminary to coating the second side of the cord series could be wound off or again passed through the calendering rolls 18 and 19 of machine 16 along the margins of the main cord series, it being understood that the preliminary purpose of the marginal edge cords and their removal is to reach a point in the cord series where thorough rubberization of the cords has been effected. It is, however, a further important feature of my invention after withdrawing the marginal edge cords M and M' to reintroduce them at other points in the cord series so as to pass in their transposed positions through the subsequent coating operations of the second side of the cord series and form a part of the finished fabric. To this end I have provided additional rollers beyond the marginal cord take-off roller 41 to transpose the marginal cords into positions intermediate other cords of the series.

If the cords of the series are initially arranged in spaced relation the marginal cords M and M' may be reintroduced at intermediate points in the series without difficulty. On the other hand, in making weftless cord fabric the cords of the series are usually arranged in substantially edge to edge relation with only slight cracks therebetween. To avoid crowding when the marginal cords are to be reintroduced special provision is made in initially feeding the cord series from the source of supply to provide spaces S and S' at points in the series inwardly of the margins. Such arrangement is indicated in Fig. 3, and better in Fig. 4. The width of the spaces S and S' will of course be determined by the number of marginal cords which are removed from the edges of the cord series. Whether the preliminary coating of one side of the fabric is effected in one or two calendering machines, the partially coated fabric after the transposition and reintroduction of the marginal cords M and M' into the spaces S and S' will be as shown in Fig. 5.

While conceivably the marginal cords may be reintroduced at intermediate points in the cord series during passage of the series between successive calendering machines, I deem it desirable for best results to carry the cords back and pass them through the preceding calendering machine in their transposed positions so that they will be thoroughly embedded in the preliminary rubber coating before carrying out subsequent operations of applying rubber to the second side of the cords. I have therefore in the illustrative arrangement shown the marginal cords M and M' as being reintroduced on the inlet side of calendering machine 16 in the spaces S and S' of the cord series A as the same is fed for its initial coating from the source of supply to the calendering unit. Under such arrangement it will be evident that the cords M and M' at different points in their length are simultaneously being fed between calendering rollers 18 and 19 in two positions, first at the margins of the series and a second time in the spaces S and S' initially provided in the cord series.

With reference to Fig. 3, it will be noted that the idler roller 42 is positioned to conduct the marginal cords taken off by roller 41 upwardly towards the plane of the incoming cord series A. The cords then pass up through the spaces S and S' in the cord series, over guide roller 43, and thence in their new position between calendering rolls 18 and 19. There is no difficulty in feeding the marginal cords inwardly to their new positions since it is not necessary to displace them inwardly more than a few inches, but if desired either or both of rollers 42 and 43 may be grooved to insure proper alignment with the other cords of the series.

Upon the commencement of operations the marginal cords are fed through the machine and back over rollers 41, 42 and 43 to the plane of the incoming cord series. They may then be knotted at points K, shown in Fig. 2, to cords of the incoming series adjoining the spaces S and S'. The machine may then be run until the cords M and M' in their new positions, indicated in dotted lines in Fig. 3, have passed through the calendering machine. The entire cord series with the marginal cords in their new positions is threaded through the subsequent machine or machines in the usual manner.

As previously noted, Fig. 4 shows the cord series as it is fed from the source of supply. Fig. 5 shows the cords after the removal and transposition of the marginal edge cords with the coating applied to one side, such being the condition of the partially formed fabric at point B between calendering machines 16 and 31. Fig. 6 shows the fabric after the coating of the second side of the cords after it emerges at point C from the second calendering machine 31. It will be noted that the outermost cords are well rubberized at their edges.

As previously indicated the essential practices of my invention and the set-up of the coating apparatus with reference to the number and arrangement of calendering machines and the manner of feeding the weftless cord series therethrough are capable of considerable variation, and I therefore intend that the scope of my invention shall be limited only to the extent provided by the appended claims.

I claim:

1. The method of forming rubberized cord fabric to provide a thoroughly rubberized marginal edge which consists in arranging cords in parallel relation and applying rubber coating to the full width of the cord series, removing one or more of the marginal edge cords to leave an excess of rubber beyond the cord then at the edge of the series, and thereafter applying further rubber coating to the cord series.

2. The method of forming weftless cord fabric which consists in arranging a series of cords in parallel relation to a width greater than the desired width of the fabric to be formed, applying a rubber layer to one side of the unconnected cords, withdrawing from the rubber the excess marginal cords, thereby reducing the over-all width of the cord series and leaving at the margin a cord which during the application of the rubber occupied a position inwardly of the edge of the series, and after removing the excess marginal cords applying a further rubber layer to the cord series.

3. The method of forming cord fabric which consists in leading a series of cords in parallel relation including one or more extra marginal cords unconnected with the other cords, applying a coating of rubber to one side of the cord series, withdrawing the extra cords from the margin and then applying a coating of rubber to the opposite side of the cord series.

4. The method of forming cord fabric which consists in leading a main series of cords in parallel relation and simultaneously leading one or more additional edge cords in adjoining relation with the marginal cord of the main series, applying rubber coatings to the cords in a series of operations, and removing the additional edge cords from the margin of the cord series between the rubber applying steps.

5. In the method of forming weftless cord rubberized fabric by applying a plurality of layers of rubber to a series of unconnected parallel cords in successive operations, the step which includes withdrawing marginal edge cords of the series before the application of the last rubber layer to the cords.

6. In the method of forming reinforced rubber sheets by applying rubber in sheet form in separate operations to the opposite sides of a layer of reinforcing material the steps which include supplying one or more cords immediately adjacent, but unconnected with, the marginal edge of the main body of reinforcing material during the application of rubber to one side and then removing said cord or cords from the coated edge of the reinforcing body before the application of rubber to the opposite side.

7. The method of forming reinforced rubber fabric which includes forming a first sheet of rubber, applying a series of parallel cords of substantially the same width to said first sheet, removing one or more marginal cords at the edges of said sheet, forming a second sheet of rubber and applying the same to the first sheet with the cords interposed therebetween.

8. The method of forming reinforced rubber sheets which includes arranging a series of cords in parallel relation and in separate operations applying a plurality of layers of rubber to the unconnected cords, and between rubber applying steps transposing cords at the marginal edges of the series inwardly to positions between other cords of the series.

9. In the method of forming weftless cord rubberized fabric by applying layers of rubber to opposite sides of a series of unconnected parallel cords in a series of operations, the steps which include withdrawing marginal edge cords of the series following the application of the rubber to one side of the cords and before applying a layer of rubber to the opposite side of the series reintroducing the withdrawn marginal cords at other points in the series.

10. The method of uniting weftless cords and rubber into sheet form which consists in arranging the cords in parallel relation, applying rubber to one side of the cords, withdrawing cords at the marginal edges of the blank and relocating said withdrawn cords between other cords inwardly of the edges of the blank, and thereafter applying rubber to the second side of the cords.

11. The method of forming reinforced rubber fabric which includes forming a sheet of rubber, applying a series of cords of substantially the same width to said sheet, removing one or more marginal cords at the edges of said sheet and reapplying said marginal cords to the sheet between other cords of the series.

12. The method of forming cord fabric which consists in leading a series of cords in parallel relation through a set of rubber applying rolls to provide a coating of rubber on one side of the cord series, thereafter transposing one or more edge cords to positions between other cords inward of the margin of the series, and conducting the cord series through a second set of rubber applying rolls to provide a coating of rubber on the opposite side of the cords.

13. The method of forming cord fabric which consists in leading a series of cords in arranged parallel relation between a set of calender rolls and applying through said rolls a rubber coating to the cord series, returning one or more edge cords at the margin of the series and feeding said cord or cords through the same set of rolls a second time between cords of the series inward of the margin.

14. The method of feeding cords through a plurality of sets of rubber applying rolls to form weftless cord fabric which includes feeding all the cords in parallel relation through the first set of rolls and applying a layer of rubber to one side of the cord series, feeding a marginal edge group of the cords a second time through the first set of rolls at a point inwardly of the margin of the rubber layer, and then feeding said group of cords in their transposed position with the other cords through the next set of rolls and applying a layer of rubber to the opposite side of the cords.

15. The method of forming weftless cord fabric which includes arranging a main series of cords in parallel relation and feeding said cord series through successive sets of calender rolls for the application of rubber to the opposite sides thereof, feeding further small groups of parallel cords along the margins of the main cord series as the latter pass through the first set of rubber applying rolls, and feeding the cords of the small groups interposed between cords of the main series during passage through the next set of rubber applying rolls.

16. The method of forming weftless cord fabric which includes arranging a series of cords in closely spaced relation leaving one or more spaces between selected cords of the series for the insertion of additional cords, applying rubber to the opposite sides of the cord series in separate operations, and between the several rubber applying steps transposing one or more marginal edge cords to the space or spaces initially provided between other cords of the series.

17. The method of forming weftless cord fabric which includes leading from separate sources of supply a series of cords, arranging said cords in close parallel relation but with one or more spaces in the series for the introduction of additional cords, feeding the cords through a set of rubber applying rolls and forming a layer of rubber on one side thereof, separating from the series the marginal edge cords, reintroducing said separated marginal cords into the series between the sources of supply and the set of rolls to fill the spaces initially left in the series and feeding the same again through said rolls.

18. The method of forming weftless cord fabric which includes leading a main series of cords in close parallel relation and simultaneously leading a marginal group of cords in closely spaced parallel relation with each other but spaced from the main cord series a distance of one or more cords, applying rubber to one side of all the cords, then transposing sufficient of the outermost cords of the marginal group to fill the space between the marginal group and the main cord series, and thereafter applying a further rubber coating to the cords.

19. The method of forming weftless cord fabric which includes leading from separate sources of supply a series of cords, arranging said cords in parallel relation but with one or more spaces in the series for the introduction of additional cords, providing a set of rubber applying rolls adapted to coat the cords on one side, feeding certain cords of the series through said rolls a first time at the marginal edges of the series and a second time through said rolls in the spaces initially left in the series, and feeding the remaining cords only once through said rolls as said selected cords are passed through the rolls in their two positions, and feeding the entire series with the selected cords in their second position through a further set of rubber applying rolls and forming a coating of rubber on the opposite side.

20. An apparatus for producing cord fabric including a plurality of rubber sheet forming calendering machines, feed means for conducting a series of parallel cords successively through the different calendering machines for the application of successive coatings of rubber to the cords, and means positioned intermediate said machines operative after the preliminary coating of the cord series for withdrawing predetermined cords from the series.

21. An apparatus for producing cord fabric including a plurality of rubber calendering machines arranged in line, means for feeding a body of cord fabric through the successive machines for the application of a series of rubber coatings to the fabric, means for simultaneously feeding marginal cords unconnected with the cord fabric body along the edges thereof during passage through one of said calendering machines, and means for withdrawing the marginal cords from the edges of the cord fabric before passage of the fabric through a subsequent calendering machine.

22. In an apparatus for producing weftless cord fabric including a rubber sheet forming calendering machine, feed means for conducting a series of unconnected cords in parallel relation through the machine for the application of rubber coating to the cords, and means at the outlet side of said calendering machine for conducting margin edge cords of the series away from the plane of the coated cord series.

23. An apparatus for producing weftless cord fabric including a plurality of rubber sheet forming calendering machines, feed means for conducting a series of unconnected parallel cords successively through said machines for the application of rubber to the opposite sides of the cords, and cord receiving means operative after the application of rubber on one side of the cords to remove marginal edge cords of the series during passage of the series from one machine to another.

24. An apparatus for producing weftless cord fabric including a plurality of rubber sheet forming calendering machines arranged in line, means for supplying a series of cords in close parallel relation, but with spaces left inwardly of the margins of the series for the introduction of additional cords, means for feeding said cord series through one of said calendering machines for the application of rubber to one side thereof, cord conveying means on the inlet side of a subsequent calendering machine for withdrawing marginal edge cords of the series before the coating of the second side of the cords, means for introducing said withdrawn marginal cords into the cord series on the inlet side of a preceding calendering machine in the spaces provided between other cords for repassage through said machine, and means for conducting all of said cords through the subsequent calendering machine for the application of rubber to the opposite side of the cord series.

25. An apparatus for producing weftless cord fabric including a plurality of rubber sheet forming calendering machines, feed means for conducting a series of unconnected parallel cords through the first calendering machine for the application of rubber to one side of the cord series, feed means for conducting the coated cords from the first machine through the second machine for the application of rubber to the opposite side, and cord conveying means operative to transpose marginal edge cords of the coated series to positions intermediate other cords of the series prior to passage of the series through the second calendering machine.

26. An apparatus for producing weftless cord fabric including a plurality of rubber applying calendering machines arranged in succession, sources of individual cord supply, feed means for conducting a series of unconnected cords from the supply in parallel assembled relation through the successive machines for the application of rubber first to one side of the cords and then to the other side, a cord supporting and conveying member positioned in the plane of the cords passing from one calendering machine to another adapted to withdraw marginal cords from the cord series, additional cord supporting and conveying means for reintroducing said withdrawn marginal cords into the cord series intermediate other cords at a point on the inlet side of one of the calendering machines.

27. An apparatus for producing weftless cord fabric including a plurality of rubber sheet forming calendering machines arranged in line, feed means for conducting a series of unconnected parallel cords through one of the calendering machines for the application of rubber to one side of the cord series, cord conveying means operative to withdraw marginal cords from the coated series and reintroduce said marginal cords to the same calendering machine at points intermediate other cords of the series, and feed means for conducting the cord series with the marginal edge cords in their transposed positions through a subsequent calendering machine for the application of rubber to the second side thereof.

28. An apparatus for producing weftless cord fabric including a plurality of rubber sheet forming calendering machines arranged in line, sources of individual cord supply, feed means for conducting a series of unconnected cords from the supply in parallel relation through the first and subsequent calendering machines for the application of successive rubber coatings to the cord series, means on the outlet side of one machine for withdrawing marginal cords from the coated series, and means for conveying said withdrawn cords back into the cord series on the supply side of the first calendering machine.

29. An apparatus for producing cord fabric including a plurality of rubber sheet forming calendering machines arranged in spaced alignment, sources of cord supply, feed means for conducting a series of cords from the supply in parallel relation through the first calendering machine, cord supporting and conveying means for conducting cords from the outlet side of said first machine back to the inlet side for reintroduction into said machine with cords from the supply, and feed means for conveying the cord series from the outlet side of the first machine through the second calendering machine.

30. In the method of making rubberized cord fabric the steps which include calendering rubber onto a body of assembled cords to the full width of the body, then removing defectively rubberized cords from the rubber margins of the blank where the rubber tends to be too thin so as to leave thoroughly rubberized cords at the edges of the blank with a marginal excess of rubber beyond the edgemost cords.

31. The method of making rubberized cord fabric to provide a thoroughly rubberized edge which includes applying rubber to an assembled body of cords, removing marginal cords only from the cord body, causing the remaining rubber from which the cords are removed to curl inwardly towards the cord body, and then compressing the curled marginal rubber.

32. The method of forming cord fabric which consists in leading a series of cords in parallel relation through rubber applying rolls to rubber coat the cord series, removing one or more of the marginal edge cords of the series to leave an excess of rubber beyond the cord then at the edge, and leading the rubberized cord series through a further set of rolls where the marginal excess of rubber which inherently tends to curl inwardly is compressed.

33. An apparatus for producing cord fabric including means for feeding a series of cords in close parallel relation, rubber calendering rolls adapted to apply rubber to said cord series to form a rubberized fabric blank, means for withdrawing marginal cords from the rubberized blank, and further rolls operative to press the blank at the rubber areas thereof from which the cords are removed.

LEE WELLS.